United States Patent
Wu et al.

(10) Patent No.: US 12,530,840 B2
(45) Date of Patent: Jan. 20, 2026

(54) METHODS AND SYSTEMS FOR TRAINING QUANTIZED NEURAL RADIANCE FIELD

(71) Applicant: SHANGHAITECH UNIVERSITY, Shanghai (CN)

(72) Inventors: Minye Wu, Shanghai (CN); Chaolin Rao, Shanghai (CN); Xin Lou, Shanghai (CN); Pingqiang Zhou, Shanghai (CN); Jingyi Yu, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 322 days.

(21) Appl. No.: 18/369,904

(22) Filed: Sep. 19, 2023

(65) Prior Publication Data
US 2024/0013479 A1    Jan. 11, 2024

Related U.S. Application Data

(63) Continuation of application No. PCT/CN2021/083444, filed on Mar. 26, 2021.

(51) Int. Cl.
*G06T 15/55* (2011.01)
*G06T 15/20* (2011.01)
*G06T 17/20* (2006.01)

(52) U.S. Cl.
CPC .............. *G06T 15/55* (2013.01); *G06T 15/20* (2013.01); *G06T 17/20* (2013.01); *G06T 2210/56* (2013.01)

(58) Field of Classification Search
CPC ......... G06T 15/55; G06T 15/20; G06T 17/20; G06T 2210/56; G06T 15/506; G06T 15/08

(Continued)

(56) References Cited

U.S. PATENT DOCUMENTS

| 7,262,770 B2 * | 8/2007 | Sloan ............ G06T 15/506 345/426 |
| 7,609,265 B2 * | 10/2009 | Sloan ............ G06T 15/506 345/426 |

(Continued)

FOREIGN PATENT DOCUMENTS

CN    112504271 A    3/2021

OTHER PUBLICATIONS

Ben Mildenhall, et al., NeRF: Representing Scenes as Neural Radiance Fields for View Synthesis, European Conference on Computer Vision, 2020, pp. 1-25.

*Primary Examiner* — Sheree N Brown
(74) *Attorney, Agent, or Firm* — Bayramoglu Law Offices LLC

(57) ABSTRACT

A computer-implemented method includes encoding a radiance field of an object onto a machine learning model; conducting, based on a set of training images of the object, a training process on the machine learning model to obtain a trained machine learning model, wherein the training process includes a first training process using a plurality of first test sample points followed by a second training process using a plurality of second test sample points located within a threshold distance from a surface region of the object; obtaining target view parameters indicating a view direction of the object; obtaining a plurality of rays associated with a target image of the object; obtaining render sample points on the plurality of rays associated with the target image; and rendering, by inputting the render sample points to the trained machine learning model, colors associated with the pixels of the target image.

20 Claims, 7 Drawing Sheets

(58) Field of Classification Search
USPC .......................................................... 345/419
See application file for complete search history.

(56) References Cited

U.S. PATENT DOCUMENTS

| | | | | |
|---|---|---|---|---|
| 7,839,404 | B2* | 11/2010 | Bordoloi | G06T 15/08 |
| | | | | 382/152 |
| 2008/0024493 | A1* | 1/2008 | Bordoloi | G06T 15/08 |
| | | | | 345/423 |

* cited by examiner

METHODS AND SYSTEMS FOR TRAINING QUANTIZED NEURAL RADIANCE FIELD

CROSS REFERENCE TO THE RELATED APPLICATIONS

This application is a continuation application of International Application No. PCT/CN2021/083444, filed on Mar. 26, 2021, the entire contents of which are incorporated herein by reference.

TECHNICAL FIELD

This disclosure generally relates to the technical fields of Computer Vision and Machine Learning, and more specifically, to methods and systems for training quantized neural radiance field.

BACKGROUND

Neural Radiance Field, or NeRF, is a framework that allows reconstruction and rendering of an object by utilizing a radiance field of the object. A radiance field of an object can be generally thought of as a representation or visualization of the object in a three-dimensional (3D) rendering space through which various renderings, such as images or videos, of the object can be generated. By using a machine learning model such as Multiplayer Perceptron (MLP), novel views or video animations of the object can be rendered based on the radiance field.

A NeRF framework for generating various renderings of an object can be computationally intensive, which significantly limits the applications of the NeRF technique in scenarios that require real-time response. Reducing the number of sample points may accelerate the rendering speed. However, the quality of the rendering result deteriorates as the number of the sample points decreases.

SUMMARY

In view of the limitations of existing technologies described above, this disclosure provides methods and systems for training quantized neural radiance field that address these limitations.

One aspect of this inventive concept is directed to a computer-implemented method. The method may include encoding, by a computer device, a radiance field of an object onto a machine learning model; conducting, by the computer device and based on a set of training images of the object, a training process on the machine learning model to obtain a trained machine learning model. The training process may include a first training process using a plurality of first test sample points followed by a second training process using a plurality of second test sample points. Each of the first sample points and the second sample points may be located on a plurality of training rays derived from the training images.

The method may further include obtaining target view parameters indicating a viewpoint and a view direction of the object; obtaining, based on the view parameters, a plurality of sample rays associated with a target image of the object, the target image associated with the viewpoint and the view direction: obtaining, by the computer device, render sample points on the plurality of sample rays associated with the target image; and rendering, by inputting the render sample points to the trained machine learning model, colors associated with the pixels of the target image.

In some embodiments, the radiance field may include a three-dimensional (3D) rendering space enclosing the object.

In some embodiments, the machine learning model may be a fully connected neural network comprising one or more nodes, each having an associated weight.

In some embodiments, the machine learning model may be configured to accept a position vector and a direction vector of a point in the 3D rendering space as an input and output a density and a radiance of the point. The position vector may indicate a location of the point with respect to the viewpoint, and the direction vector may indicate a relative direction of the point with respect to the viewpoint.

In some embodiments, during the second training process, values of the weights, elements of the position vectors, elements of the direction vectors, the densities, and the radiances are quantized.

In some embodiments, obtaining render sample points on the plurality of sample rays may include obtaining the render sample points, wherein the render sample points are located within the threshold distance from the surface region of the object.

In some embodiments, the surface region of the object may be obtained using a marching cube technique based on the set of training images, and the surface region may be in a form of triangular mesh.

In some embodiments, the threshold distance may be 2 cm.

This specification further presents a device. The device may include a processor and a memory. The memory may store instructions executable by the processor. Upon being executed by the processor, the instructions may cause the processor to perform any one of the methods in the method embodiments.

This specification further presents a non-transitory storage medium. The storage medium may store instructions executable by a processor. Upon being executed by the processor, the instructions may cause the processor to perform any one of the methods in the method embodiments.

In the computer-implement method disclosed herein, an object's surface region is determined based on a plurality of test images under a NeRF model. Then, to render a target image of the object under a given viewpoint based on the NeRF model, the rendering's sample points may be collected on or near the surface region of the object. Since the sample points far away from the object's surface region contribute little to the rendering of the object, this sampling scheme may achieve the same rendering quality with a smaller number of sample points than convention sampling methods. This specification further discloses a training scheme of the NeRF model that includes a first training process followed by a second training process. During the second training process, the sample points used for training may be collected on or near the object's surface region. This training scheme improves the efficiency of the training compared to convention methods. Additionally, a quantization framework is disclosed, which may be applied to one or more of the training and rendering processes. The quantization process optimizes the data of the training and/or rendering process to allow it to be processed more efficiently by certain hardware such as Artificial Intelligent (AI) chips.

Both the foregoing general description and the following detailed description are exemplary and explanatory only and are not restrictive of this inventive concept.

BRIEF DESCRIPTION OF THE DRAWINGS

The accompanying drawings, which are incorporated in and constitute a part of the description, illustrate embodiments consistent with the present invention and, together with the description, explain the disclosed principles. It is apparent that these drawings present only some embodiments of the present invention, and those of ordinary skill in the art may obtain drawings of other embodiments from them without exerting any creative effort.

DETAILED DESCRIPTION OF THE EMBODIMENTS

Figure 1:
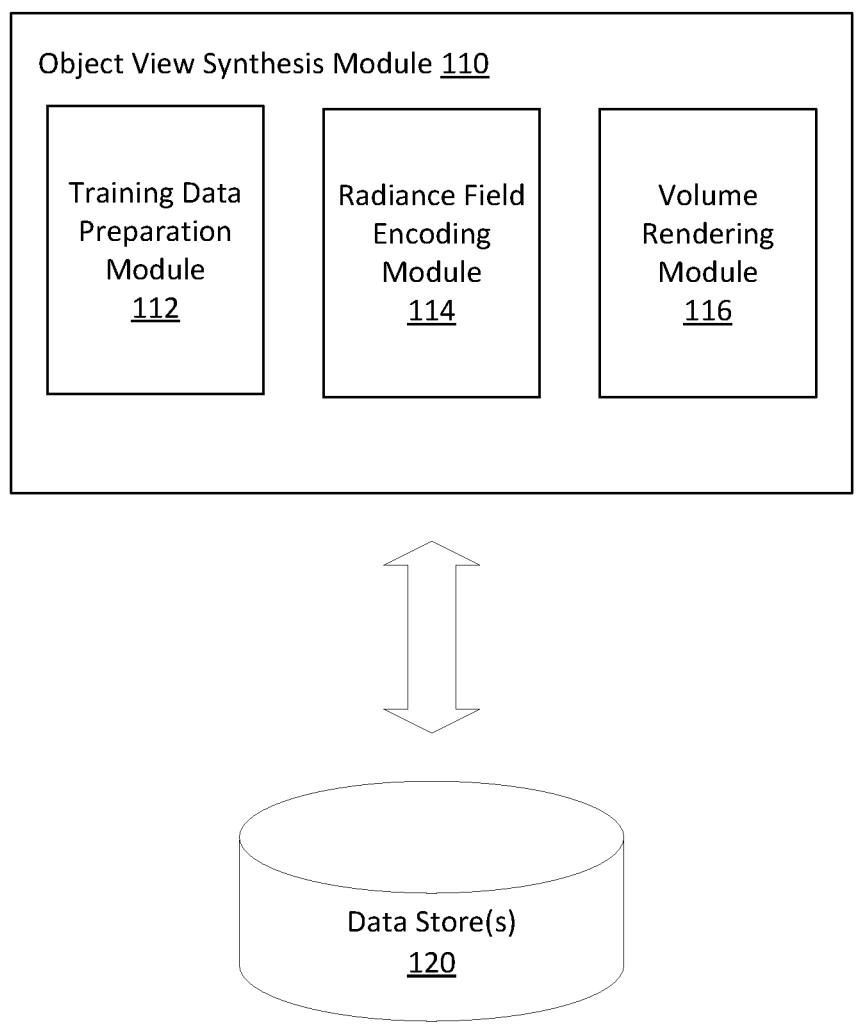
FIG. 1 shows a schematic diagram illustrating a Neural Radiance Field system in accordance with various embodiments of this specification.

Exemplary embodiments will now be described more fully with reference to the accompanying drawings. However, these exemplary embodiments can be implemented in many forms and should not be construed as limited to those set forth herein. Rather, these embodiments are presented to provide a full and thorough understanding of this inventive concept and to fully convey the concepts of the embodiments to others skilled in the art. In addition, the described features, structures, and characteristics may be combined in any suitable manner in one or more embodiments. In view of this inventive concept herein, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

The drawings are presented to illustrate and exemplify the inventive concept and not necessarily drawn to scale. In the drawings, like reference numerals indicate the same or analogous elements, and duplicate detailed description thereof will thus be omitted.

Neural Radiance Field (NeRF) is a framework that allows the reconstruction and rendering of complex scenes or objects by optimizing an underlying radiance field using several input images. Under the NeRF framework, a static scene or object may be represented by a continuous five-dimensional (5D) function.

To accomplish the rendering of a scene or an object, the 5D function representing the scene or object may be implemented by a fully connected neural network, such as a Multiplayer Perceptron (MLP). The neural network may take a position vector indicating a location of a point (e.g., a 3D Euclidean coordinate $(x, y, z)$) and a direction vector indicating a direction of that point with respect to a viewpoint (e.g., spherical coordinate $(\theta, \phi)$) as an input and output the density ($\rho$) at that point and the radiance at that point along the direction (e.g., the RGB values at the point).

The radiance on all the points in the space may form a radiance filed, based on which an image from any given viewpoint may be generated by volume rendering.

To improve the accuracy of the images generated by the neural network, the neural network may be trained by calibrating the images generated by the neural network with training images (i.e., ground truth) to optimize its parameters. Once the training is completed, the trained neural network may be able to generate an image of the scene or object at any given viewpoint.

FIG. 1 shows a schematic diagram illustrating a Neural Radiance Field (NeRF) system 100 in accordance with various embodiments of this specification. As shown in FIG. 1, the Neural Radiance Field system 100 may include an object view synthesis module 110, which can be configured to generate real-time renderings of an object based on a NeRF framework.

In some embodiments, the object view synthesis module 110 may be implemented, in part or in whole, as software, hardware, or any combination thereof. In some embodiments, the object view synthesis module 110 can be implemented, in part or in whole, as software running on one or more computing devices or systems, such as a cloud computing system. For example, the object view synthesis module 110 can be implemented, in part or in whole, on a cloud computing system to generate images of an object under a NeRF framework from various selected perspectives or viewpoints.

In some embodiments, the object view synthesis module 110 may include a training data preparation module 112, a radiance field encoding module 114, and a volume rendering module 116. Each of these modules is discussed below.

In some embodiments, as shown in FIG. 1, the NeRF system 100 may further include one or more data stores 120. The object view synthesis module 110 may be configured to communicate and/or operate with the one or more data stores 120. The one or more data stores 120 may store various types of data associated with the object view synthesis module 110.

For example, the at least one data store 120 can store training data with which to train a machine learning model to encode a radiance field of an object onto the machine learning model. The training data can include, for example, images depicting the object from various viewpoints. For instance, the at least one data store 120 can store a plurality of images depicting a dog to train a machine learning model to encode a radiance field of the dog onto the machine learning model. In some embodiments, the at least one data store 120 can store data relating to radiance fields such as radiance and volume densities accessible to the object view synthesis module 110.

In some embodiments, the at least one data store 120 can store various data relating to triangular mesh and depth maps accessible to the object view synthesis module 110. In some embodiments, the at least one data store 120 can store machine-readable instructions (e.g., codes). Upon being executed, the instructions may cause one or more computing systems to perform training of a machine learning model or render images based on radiance fields. Other implementations of the Neural Radiance Field system 100 are contemplated.

In some embodiments, the training data preparation module 112 may be configured to generate training data for training a machine learning model to encode a radiance field of an object on the machine learning model. In general, a radiance field of an object may be a representation or visualization of the object in a three-dimensional rendering space through which various views of the object can be rendered (e.g., synthesized, constructed, etc.). The training data to encode the radiance field of the object can comprise a set of images depicting the object at various viewpoints. For example, a first image in the set of images can depict the object in a frontal view, a second image in the set of images can depict the object in a side view, in the set of images a third image can depict the object in a top view, etc.

To reduce the complexity and time to train the machine learning model, the training data preparation module 112 may convert the set of images into a continuous five-dimensional (5D) representation. In the continuous 5D representation, each pixel in each image of the set of images can be represented by a position vector and a direction vector. The position vector may be, for example, Euclidean coordinates (x, y, z), and the direction vector may be, for example, spherical coordinates (θ, φ). As such, each pixel in each image of the set of images can be represented by parameters of x, y, z, θ, and φ, or in five dimensions, and the set of images can be represented by a continuous string of parameters of x, y, z, θ, and φ.

By representing training data in such a manner, the dimensionality of training the machine learning model to encode the radiance field of the object may be greatly reduced, thereby reducing time needed to train the machine learning model. In some embodiments, position vectors and direction vectors of pixels in an image can be determined based on a pose associated with the image. A pose of an image is an estimation of a position and orientation (or direction) of an object depicted in the image from a center of a camera from which the image was captured.

In one implementation, a pose of an image can be estimated based on a structure from motion (SfM) technique. In another implementation, a pose of an image can be estimated based on a simultaneous localization and mapping (SLAM) technique. Other methods to estimate the pose of an image are contemplated, and this specification is not limited in this regard.

In some embodiments, the radiance field encoding module 114 may be configured to encode a radiance field of an object onto a machine learning based on training data provided by the training data preparation module 112. Once the radiance field of the object is encoded onto the machine learning model, the machine learning model can be queried to output radiance and volume densities associated with points in the radiance field from various vantage points. In general, a vantage point can be a point in the radiance field (i.e., the three-dimensional rendering space) from which an imaginary light ray can be injected into the radiance field in a direction through the point. As such, a vantage point can have a position vector indicating a location in the radiance field and a direction vector indicating a direction.

As an illustrative example, in some embodiments, the machine learning model can be queried based on a vantage point comprising a position vector concatenated with a direction vector. An imaginary light ray can be generated to travel through the radiance field at a point indicated by the position vector and at a direction indicated by the direction vector. In this example, the machine learning model can output radiance and volume densities along with points in the radiance field through which the imaginary light ray has traveled.

In some embodiments, the machine learning model may be implemented using a fully connected neural network such as a multilayer perceptron (MLP). For example, in one implementation, the machine learning model can be implemented using a neural network comprising nine fully connected perceptron layers. This neural network can be trained to encode a radiance field of an object. In this implementation, the neural network can take a position vector corresponding to a point as input and output a volume density and a feature vector for the point at the eighth layer of the neural network. The feature vector can then be concatenated with a direction vector corresponding to the point and pass it to the last layer of the neural network to output a radiance for the point. Other machine learning models are contemplated, and this specification is not limited in this regard.

In some embodiments, a machine learning model through which the radiance field encoding module 114 is configured can be expressed as follows:

$$f(m,s)=[\rho,r] \qquad (1)$$

where m is a position vector at a point in a radiance field, s is a direction vector at the point in the radiance field, ρ is the volume density along a direction of the direction vector in the radiance field, and r is the radiance along the direction of the direction vector in the radiance field. In this regard, the machine learning model can be expressed as a function $f$ that takes the position vector and the direction vector as inputs and outputs the radiance and the volume density along the direction of the direction vector in the radiance field.

The machine learning model may include a plurality of parameters. In the embodiments in which the machine learning model is a fully connected neural network, these parameters may be weights of the neural network each associated with a node of the neural network. During the training of the machine learning model, the parameters associated with the machine learning model may be optimized through, for example, back-propagation, such that the output from the function $f$ converges to a reference radiance field (e.g., the ground truth radiance field). Once the output from the function $f$ has sufficiently converged to the reference radiance field (e.g., the difference between the output and the reference field is less than a threshold), training for the machine learning model is deemed complete and the parameters for the machine learning model become fixed. The trained machine learning model may output the radiance and the volume density (e.g., ρ, r) along any direction corresponding to any point (e.g., in, s) in the radiance field.

In some embodiments, to prevent over-smoothing of the radiance field, a Positional Encoding (PE) technique may be applied during the training of the machine learning model. The PE technique may transform the position vector, in, and the direction vector, s, from a low-dimensional space (e.g., 5D space) to a higher-dimensional space to increase the fidelity of the radiance field. In some embodiments, the PE technique may be implemented based on a sinusoidal expression as shown as:

$$\gamma(x)=[\sin(2^0 x),\cos(2^0 x),\sin(2^1 x),\cos(2^1 x),\ldots,\sin(2^L x),\cos(2^L x)] \qquad (2)$$

where L is a hyper-parameter. In one implementation, L may be set to 9 for γ(m) and 4 for γ(s). In this implementation, the PE technique may allow the machine learning model to take 76-dimension vectors as inputs instead of 5-dimension vectors (e.g., x, y, z, θ, φ) to output radiance and volume density. The PE may prevent a typical flaw of an MLP that a signal is over-smoothed by an MLP.

In some embodiments, the volume rendering module 116 may be configured to generate renderings (e.g., images, videos, etc.) of an object based on a radiance field of the object. The volume rendering module 116 may generate a depth map of the object based on volume densities associated with the radiance field.

Figure 2:
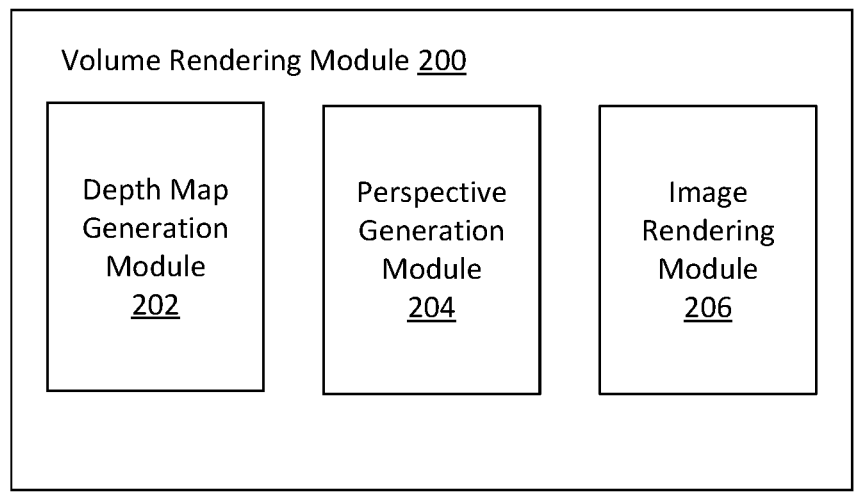
FIG. 2 shows a schematic diagram illustrating an exemplary volume rendering module in accordance with various embodiments of this specification.

FIG. 2 shows a schematic diagram illustrating an exemplary volume rendering module in accordance with various embodiments of this specification. In some embodiments, the volume rendering module 116 of FIG. 1 can be implemented as the volume rendering module 200 of FIG. 2.

As shown in FIG. 2, in some embodiments, the volume rendering module 200 may include a depth map generation module 202, a perspective generation module 204, and an image rendering module 206. Each of these modules will be discussed below.

In some embodiments, the depth map generation module 202 may be configured to generate a depth map of an object based on a radiance field of the object. Initially, the depth map generation module 202 may evaluate volume densities of points associated with the radiance field of the object. The volume densities may represent the opacities of the points. The depth map generation module 202 may discretize the radiance field into a plurality of voxels. A voxel may be a unit of graphic information in a three-dimensional space, like a pixel in a two-dimensional image. The depth map generation module 202 may obtain a volume density associated with each voxel by querying a machine learning model that encoded the radiance field to output the volume density for the voxel.

Based on volume densities of the plurality of voxels, the depth map generation module 202 may generate surfaces (e.g., iso-surfaces) for the object. In one example, the radiance field may be discretized, and the density at each discretized voxel may be evaluated. Then, a marching cube technique may be adopted to extract an iso-surface in the form of triangular mesh.

In general, voxels corresponding surfaces of an object have approximately equal volume densities, voxels corresponding to regions near the surfaces of the object may have high volume densities, and voxels corresponding to regions away from the surfaces of the object may have low volume densities.

Based on these principles, the triangular meshes for the object can be generated. Correspondingly, the depth map of the object can be generated based on the triangular meshes using conventional techniques.

In some embodiments, the perspective generation module 204 may be configured to generate a camera transformation matrix and a projection matrix with which an image of an object may be rendered through a radiance field of the object. The camera transformation matrix may represent a transformation that places the camera in the correct position and orientation in world space. The projection matrix may represent a transformation that transforms pixel information (e.g., vertices) from a camera space into a device space, a space on which the resulted image is displayed.

The camera transformation matrix and the projection matrix may be generated based on a point (e.g., a perspective) associated with the radiance field looking at the object. For example, a radiance field may depict an artifact. In this example, a point in the radiance field can be selected such that the artifact is positioned and oriented in the radiance field from the perspective of the point (e.g., "framing" the artifact). In this regard, the transformation matrix and the projection matrix may be transformations that, when combined, transform vertices of the object from the radiance field to a two-dimensional image space. Through the image space, the image of the object may be rendered.

In some embodiments, the image rendering module 206 may be configured to render an image of an object for a given transformation matrix and a given projection matrix.

In general, the image rendering module 204 may utilize volume rendering techniques to render an image. In such techniques, an image may be rendered (constructed) by compositing pixels in an image space as indicated by the camera transformation and projection matrices. The image rendering module 206 may render color of each pixel based on an absorption and emission particle model in which color of a pixel is determined based on a light ray injected into a radiance field of the object.

In some embodiments, given a camera transformation matrix and the projection matrix, each pixel may be rendered using volume rendering and the final image may be constructed by composing all the pixels. By assuming an absorption and emission particle model, rendering a light ray may be completed by a line integral. In one example, the range of the integral path may be defined by the intersections of the light ray with a near plane and a far plane. The near plane and the far plane may be determined by the actual size of the scene. The rendering may be performed by the equation of:

$$C(l) = \int_{l_f^n} \rho(t) r(t) e^{-\int_{l_f^t} \rho(x) dx} dt \qquad (3)$$

where $l_f^n$ represents the line segment starting from the far plane and ends at the near plane. C(l) represents the evaluated color of the ray l.

In some embodiments, the image rendering module 204 may render color of a pixel based on a numerical quadrature expression of:

$$\hat{C}(l) = \sum_{i=0}^{N-1} \left(1 - e^{-\rho_i \delta_i}\right) e^{-\sum_{j=i}^{N-1} \rho_i \delta_i} r_i \qquad (4)$$

where $\hat{C}(l)$ is a color of a pixel, $\rho_i$ is a volume density of an i-th voxel queried through a machine learning model that encoded the radiance field, $r_i$ is a radiance of the i-th voxel queried through the machine learning model that encoded the radiance field, and $\delta_i$ is a Euclidean distance between the i-th and an (i+1)-th voxel, and N is a total number of voxels along a light ray l.

One limitation of the rendering process described above is its heavy computational burden. In one example, in volume rendering techniques, N may be 196. As such, as shown in the expression, rendering a color of a pixel of an image take up to 196 summation iterations (i.e., N=196) and consider radiances and volume densities of 196 voxels. As such, these volume rendering techniques can be computationally impractical to render an image in real-time.

Some improvements have been made to improve the efficiency of the rendering process. For example, instead of using a single neural network to represent the scene, a hierarchical volume sampling scheme that using two neural networks (one "coarse" network and one "fine" network) may be used for improved rendering efficiency.

Figure 3:
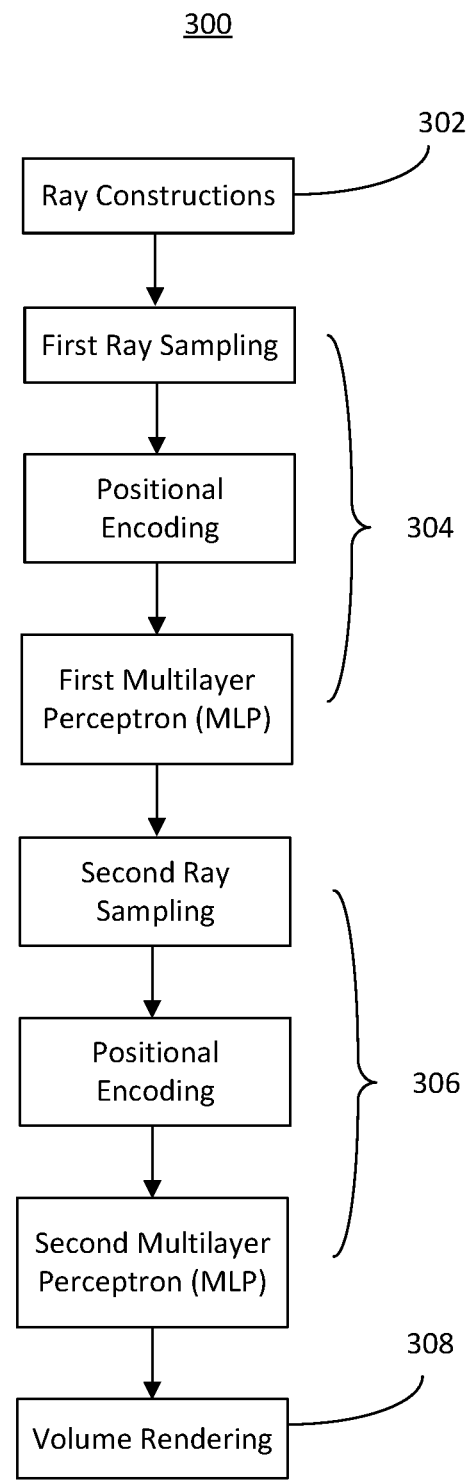
FIG. 3 shows a schematic diagram illustrating a pipeline for rendering in accordance with some techniques.

FIG. 3 shows a schematic diagram illustrating a pipeline for rendering in accordance with some techniques. As shown in FIG. 3, the pipeline for rendering 300 adopts a hierarchical volume sampling scheme, which uses two sampling scheme and two neural networks to improve the rendering efficiency.

As shown in FIG. 3, the pipeline for rendering 300 may include the following steps 302 through 308. In step 302, a plurality of rays may be constructed based on a given viewpoint. In steps 304, a first set of sample points may be obtained. The first set of sample points may be any points located on the rays between the near plane and the far plane.

After the first set of sample points are obtained, the position vector and the direction vector associated with each of the first set of sample points may be provided to the first neural network (i.e., the first MLP) to determine the volume density p and the radiance r at each of the first set of sample points.

In step 306, a second set of sample points may be obtained based on the outputs from the first MLP. In one example, using Equation (4), an estimated color $\hat{C}_c(r)$ on each of the first set of sample points may be obtained based on the densities and the radiances from the first MLP. Then, an estimated color distribution in the space may be determined based on the estimated color $\hat{C}_c(r)$ on each of the first set of sample points. Then, the second set of sample points may be obtained based on the estimated color distribution. In one example, the second set of sample points may be obtained from the parts of the volume that are likely to be more relevant to the final rendering result (e.g., volume that contains visible contents) based on the color distribution. Then, the position vector and the direction vector associated with the second set of sample points may be input to the second neural network (i.e., the second MLP).

In step 308, the final volume rendering result may be obtained based on the output from the second neural network.

Figure 4:
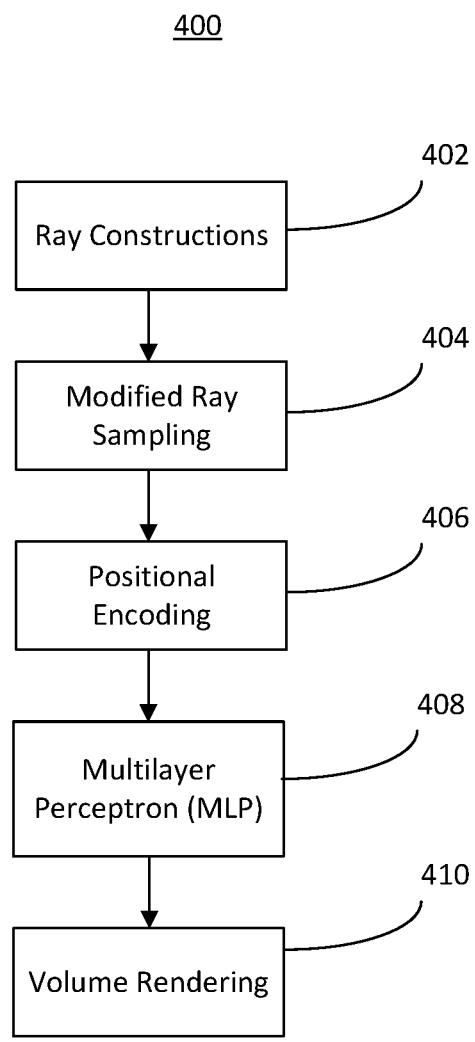
FIG. 4 shows a schematic diagram illustrating a pipeline for rendering in accordance with various embodiments of this specification.

This specification provides an improved pipeline for rendering. FIG. 4 shows a schematic diagram illustrating the improved pipeline for rendering in accordance with various embodiments of this specification.

As shown in FIG. 4, the improved pipeline for rendering 400 may include the following steps 402 through 410.

In step 402, a plurality of pixel rays may be constructed based on a given viewpoint and a given view direction. The viewpoint may be a point from which a target image of the object to be observed, and the view direction may be the direction along which the target image to be observed. The viewpoint and the view direction may be determined based on target view parameters. In one example, the view parameters may include a 3D location in the space representing the viewpoint and a 2D vector representing the view direction. Other types of view parameters are contemplated, and this specification is not limited in this regard.

In step 404, a set of sample points may be obtained. The set of sample points may be located along each of the pixel rays between the near plane and the far plane. The near plane and the far plane may be two planes that define the space to be involved in the rendering of the target image. In one example, the near plane and the far plane may be determined based on a specific need beforehand. Other methods to determine the near plane and the far plane are contemplated, and this specification is not limited in this regard.

Each of the sample points may include information including a position vector in and a direction vector s at the sample point. In one example, the position vector m may be a 3D Euclidean coordinate (x, y, z) of the sample point, and the direction vector s may be a set of spherical coordinates (θ, φ) indicating a direction. In one example, the position vector in may represent the location of the sample point with respect to the location of the viewer determined in step 402, and the direction vector s may represent a relative direction between the sample point and the location of the viewer.

In step 404, the set of sample points may be obtained using a modified ray sampling scheme along the pixel rays. In the modified ray sampling scheme, the set of sample points may be points that are on the pixel rays and close to a surface region of the object. Various methods may be used to determine the surface region of the object. In one example, the surface region may be determined based on the NeRF model using existing images of the object. For example, based on existing images of the object, volume densities of the voxels in the space enclosing the object may be determined, and the surface region of the object may include the voxels having approximately equal volume densities (e.g., volume densities within a preset range). In one example, a marching cube technique may be adopted to extract a surface region of the object based on the volume densities, and the surface region of an object may be represented by triangular meshes. In another example, the surface region of the object may be provided by a third-party source (e.g., by a user).

A sample point is close to a surface region of an object if the sample point is on the surface region or within a threshold distance from the surface region. The threshold distance may be determined according to a specific need. In one example, the threshold distance may be 2 cm. Other threshold distances are contemplated, and this specification is not limited in this regard.

In step 406, the PE technique may be applied to the sample points to increase the dimensions of the sample points. In one example, a sinusoidal expression of Equation (2) may be used for the PE technique. In Equation (2), L may be set to 9 for γ(m) and 4 for γ(s). Other implementations of the PE technique are contemplated, and this specification is not limited in this regard.

In step 408, after the sample points are processed by the PE technique, the processed data γ(m) and γ(s) may be input to a neural network model such as an MLP to determine the radiance and density for each of the voxels in the 3D space enclosing the object. The size of the 3D space as well as the size of each voxel may be determined according to a specific need and is not limited in this regard.

In step 410, based on the densities and the radiances of the voxels, the evaluated color C(l) for each ray l may be obtained according to Equation (4). The target image then may be obtained using existing volume rendering technique based on C(l) for each ray l.

The pipeline for rendering shown in FIG. 4 adopts a modified sampling scheme, in which only points that are located on or near the surface region of the object may be sampled. Since the points that are far away from the surface region of the object make little, if there is any, contribution to the rendering result. The modified sampling scheme may greatly reduce the number of sample points needed, and hence the computational complexity associated with the rendering, without penalty to the rendering result.

Figure 5:
FIG. 5 shows a schematic diagram illustrating a training strategy in accordance with various embodiments of this specification.

Based on the inventive concept present above, this specification further presents a training process for training a neural network in the NeRF framework. FIG. 5 shows a schematic diagram illustrating a training strategy in accordance with various embodiments of this specification.

As shown in FIG. 5, the training process may include a first training process followed by a second training process. The first training process may adopt a first sampling method to collect a plurality of first test sample points for training. The second training process may adopt a modified sampling method that is different from the first sampling method to collect a plurality of second test sample points for training.

In one example, the plurality of first test sample points may be the sample points obtained from each of the rays between the near plane and the far plane. Various methods may be used to determine the locations of the first sample points along each of the ray. In one example, the first test sample points may be voxels that are evenly distributed along each of the rays between the near plane and the far plane. The distance between neighboring first sample points on each ray may be determined according to a specific need and is not limited in this specification.

The plurality of second sample points may be the sample points located on or near the surface region of the object. In one example, the second sample points may be distributed within a threshold distance from the surface region of the object. The threshold distance may be determined according to a specific need. In one example, the threshold distance may be 2 cm. Other threshold distances are contemplated, and this specification is not limited in this regard.

The objective of the training process may be that the difference between the images output by the neural network and the ground truth is as small as possible. In one example, the objective of the training process is to minimize a loss function $\mathcal{L}$, which can be expressed as:

$$\mathcal{L} = \Sigma_{r \in \mathcal{R}}[\|\hat{C}_r(r) - C(r)\|_2^2] \quad (5)$$

wherein $\mathcal{R}$ is the set of pixel rays used in the training, and $C(r)$, and $\hat{C}_r(r)$ are the ground truth colors and the predicted RGB colors for pixel ray r by the neural network, respectively.

This specification further provides a quantization process to speed up the rendering process. The quantization process may include quantizing the values of the weights of the neural network, the 3D positions, the densities, individual elements of the direction vectors, and the radiances. That is, the quantization process may make the values of these parameters be restricted to be a plurality of discretized values. In one example, the quantization process may make the values of these parameters be integers, and the quantization process may be implemented by assigning each of the weights, the 3D positions, the densities, individual elements of the direction vectors, and the radiances to be the nearest integer of their actual value. Other implementations of the quantization process are contemplated, and this specification is not limited in this regard.

The quantization process may be applied to one or more of the first training, the second training, and the rendering processes. In one example, the quantization process may be applied to only the second training process. The quantization process optimizes the data of the training and/or rendering process to allow it to be processed more efficiently by certain hardware such as Artificial Intelligent (AI) chips.

In the computer-implement method disclosed herein, an object's surface region is determined based on a plurality of test images under a NeRF model. Then, to render a target image of the object under a given viewpoint based on the NeRF model, the rendering's sample points may be collected on or near the surface region of the object. Since the sample points far away from the object's surface region contribute little to the rendering of the object, this sampling scheme may achieve the same rendering quality with a smaller number of sample points than convention sampling methods. This specification further discloses a training scheme of the NeRF model that includes a first training process followed by a second training process. During the second training process, the sample points used for the training may be collected on or near the object's surface region. This training scheme improves the efficiency of the training compared to convention methods. Additionally, a quantization framework is disclosed, which may be applied to one or more of the training and rendering processes. The quantization process optimizes the data of the training and/or rendering process to allow it to be processed more efficiently by certain hardware such as Artificial Intelligent (AI) chips.

Figure 6:
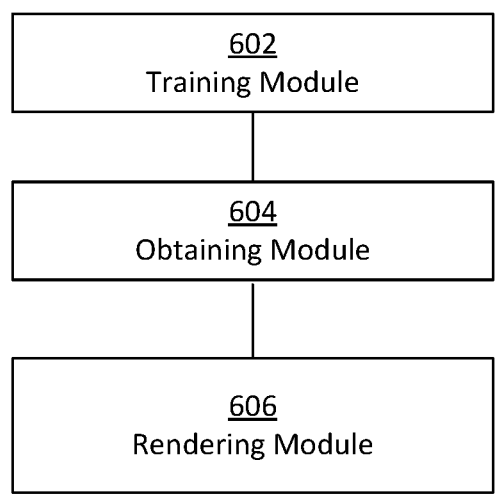
FIG. 6 shows a block diagram of a computer system in accordance with various embodiments of the specification.

FIG. 6 shows a block diagram of a computer system in accordance with various embodiments of the specification.

As shown in FIG. 6, the computer system 600 may include a training module 602, an obtaining module 604, and a rendering module 606.

The training module 602 may be configured to encode a radiance field of an object onto a machine learning model; conduct, based on a set of training images of the object, a training process on the machine learning model to obtain a trained machine learning model, wherein the training process includes a first training process using a plurality of first test sample points followed by a second training process using a plurality of second test sample points, each of the first test sample points and the second test sample points located on a plurality of rays derived from the training images, the second test sample points located within a threshold distance from a surface region of the object.

The obtaining module 604 may be configured to obtain target view parameters indicating a view direction of the object; obtain, based on the view parameters, a plurality of rays associated with a target image of the object, the target image associated with the view direction; and obtain render sample points on the plurality of rays associated with the target image.

The rendering module 606 may be configured to render, by inputting the render sample points to the trained machine learning model, colors associated with the pixels of the target image.

Based on the inventive concept presented in the method embodiments, this specification further provides a device. The device may include a process and a memory. The memory may store instructions executable by the processor. Upon being executed by the processor, the instructions may cause the processor to perform any one of the methods in the method embodiments described above.

Based on the inventive concept presented in the method embodiments, this specification further provides a non-transitory storage medium. The storage medium may store instructions executable by a processor. Upon being executed by the processor, the instructions may cause the processor to perform any one of the methods in the method embodiments described above.

Figure 7:
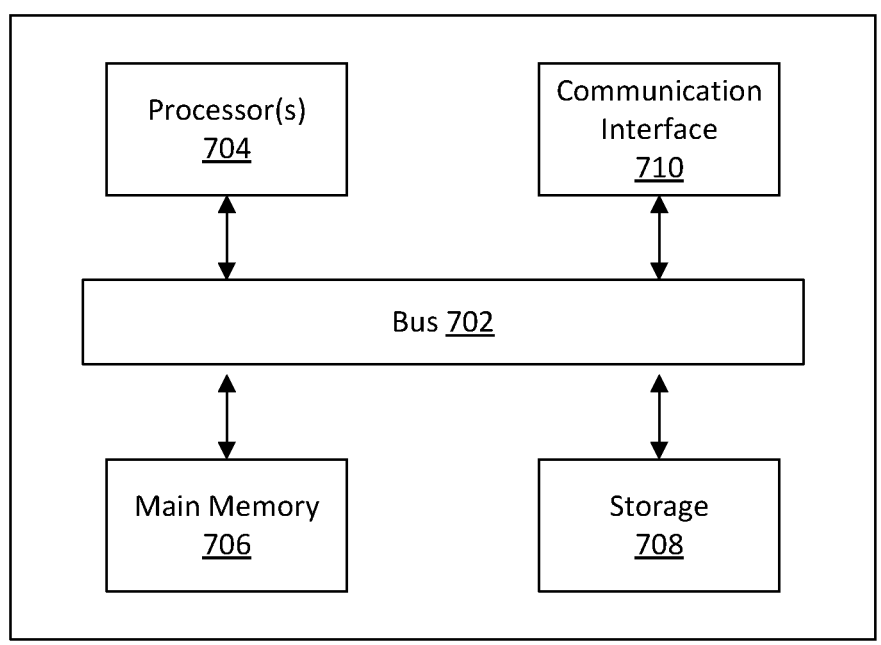
FIG. 7 shows a block diagram of a computer system in which any of the embodiments described herein may be implemented.

FIG. 7 is a block diagram that illustrates a computer system 700 upon which any of the embodiments described herein may be implemented. The computer system 700 may include a bus 702 or other communication mechanisms for communicating information, one or more hardware processors 704 coupled with bus 702 for processing information. Hardware processor(s) 704 may be, for example, one or more general-purpose microprocessors.

The computer system 700 may further include a main memory 706, such as a random-access memory (RAM), cache, and/or other dynamic storage devices, coupled to bus 702 for storing information and instructions to be executed by processor(s) 704. Main memory 706 also may be used for storing temporary variables or other intermediate information during execution of instructions to be executed by processor(s) 704. Such instructions, when stored in storage media accessible to processor(s) 704, render computer system 700 into a special-purpose machine that is customized to perform the operations specified in the instructions. Main memory 706 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by the computer system 700 in response to processor(s) 704 executing one or more sequences of one or more instructions contained in main memory 706. Such instructions may be read into main memory 706 from another storage medium, such as storage device 708. Execution of the sequences of instructions contained in main memory 806 causes processor(s) 704 to perform the method steps described herein. For example, the method steps shown in FIGS. 1 and 2 and described in connection with these drawings can be implemented by computer program instructions stored in main memory 706. When these instructions are executed by processor(s) 704, they may perform the steps as shown in FIGS. 3, 4 and 5. In alternative embodiments, hard-wired circuitry may be used in place of or in combination with software instructions.

The computer system 700 may also include a communication interface 710 coupled to bus 702. Communication interface 810 may provide a two-way data communication coupling to one or more network links that are connected to one or more networks. As another example, communication interface 710 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across several machines. In some example embodiments, the processors or processor-implemented engines may be in a single geographic location (e.g., within a home environment, an office environment, or a server farm). In other example embodiments, the processors or processor-implemented engines may be distributed across several geographic locations.

Certain embodiments are described herein as including logic or several components. Components may constitute either software components (e.g., code embodied on a machine-readable medium) or hardware components (e.g., a tangible unit capable of performing certain operations which may be configured or arranged in a certain physical manner).

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

What is claimed is:

1. A computer-implemented method, comprising:
encoding, by a computer device, a radiance field of an object onto a machine learning model;
conducting, by the computer device and based on a set of training images of the object, a training process on the machine learning model to obtain a trained machine learning model, wherein the training process comprises a first training process using a plurality of first test sample points followed by a second training process using a plurality of second test sample points, each of the plurality of first test sample points and the plurality of second test sample points located on a plurality of training rays derived from the training images, the plurality of second test sample points located within a threshold distance from a surface region of the object;
obtaining target view parameters indicating a viewpoint and a view direction of the object;
obtaining, based on the target view parameters, a plurality of sample rays associated with a target image of the object, the target image associated with the viewpoint and the view direction;
obtaining, by the computer device, render sample points on the plurality of sample rays; and
rendering, by inputting the render sample points to the trained machine learning model, colors associated with pixels of the target image.

2. The computer-implemented method according to claim 1, wherein the radiance field comprises a three-dimensional (3D) rendering space enclosing the object.

3. The computer-implemented method according to claim 2, wherein the machine learning model is a fully connected neural network comprising at least one node, each having an associated weight.

4. The computer-implemented method according to claim 3, wherein the machine learning model is configured to accept a position vector and a direction vector of a point in the 3D rendering space as an input and output a density and a radiance of the point, the position vector indicating a location of the point with respect to the viewpoint, and the direction vector indicating a relative direction of the point with respect to the viewpoint.

5. The computer-implemented method according to claim 4, wherein during the second training process, values of the weights, elements of the position vectors, elements of the direction vectors, the densities, and the radiances are quantized.

6. The computer-implemented method according to claim 5, wherein the step of obtaining the render sample points on the plurality of sample rays comprises: obtaining the render sample points, wherein the render sample points are located within the threshold distance from the surface region of the object.

7. The computer-implemented method according to claim 5, wherein the surface region of the object is obtained using a marching cube technique based on the set of training images, and the surface region is in a form of triangular mesh.

8. The computer-implemented method according to claim 5, wherein the threshold distance is 2 cm.

9. A device comprising:
a processor; and a memory storing instructions executable by the processor, wherein the instructions are executed by the processor, the instructions cause the processor to perform operations, comprising:

encoding a radiance field of an object onto a machine learning model:

conducting, based on a set of training images of the object, a training process on the machine learning model to obtain a trained machine learning model, wherein the training process comprises a first training process using a plurality of first test sample points followed by a second training process using a plurality of second test sample points, each of the plurality of first test sample points and the plurality of second test sample points located on a plurality of training rays derived from the training images, the plurality of second test sample points located within a threshold distance from a surface region of the object;

obtaining target view parameters indicating a viewpoint and a view direction of the object;

obtaining, based on the target view parameters, a plurality of sample rays associated with a target image of the object, the target image associated with the viewpoint and the view direction;

obtaining render sample points on the plurality of sample rays; and rendering, by inputting the render sample points to the trained machine learning model, colors associated with pixels of the target image.

10. The device according to claim 9, wherein the radiance field comprises a three-dimensional (3D) rendering space enclosing the object.

11. The device according to claim 10, wherein the machine learning model is a fully connected neural network comprising at least one node, each having an associated weight.

12. The device according to claim 11, wherein the machine learning model is configured to accept a position vector and a direction vector of a point in the 3D rendering space as an input and output a density and a radiance at the point, the position vector indicating a location of the point with respect to the viewpoint, and the direction vector indicating a relative direction of the point with respect to the viewpoint.

13. The device according to claim 12, wherein during the second training process, values of the weights, elements of the position vectors, elements of the direction vectors, the densities, and the radiances are quantized.

14. The device according to claim 13, wherein the step of obtaining the render sample points on the plurality of sample rays comprises: obtaining the render sample points, wherein the render sample points are located within the threshold distance from the surface region of the object.

15. The device according to claim 13, wherein the surface region of the object is obtained using a marching cube technique based on the set of training images, and the surface region is in a form of triangular mesh.

16. The device according to claim 13, wherein the threshold distance is 2 cm.

17. A non-transitory storage medium of storing instructions executable by a process, wherein, the instructions are executed by the processors, the instructions cause the processor to perform operations, comprising:

encoding a radiance field of an object onto a machine learning model;

conducting, based on a set of training images of the object, a training process on the machine learning model to obtain a trained machine learning model, wherein the training process comprises a first training process using a plurality of first test sample points followed by a second training process using a plurality of second test sample points, each of the plurality of first test sample points and the plurality of second test sample points located on a plurality of training rays derived from the training images, the plurality of second test sample points located within a threshold distance from a surface region of the object;

obtaining target view parameters indicating a viewpoint and a view direction of the object;

obtaining, based on the target view parameters, a plurality of sample rays associated with a target image of the object, the target image associated with the viewpoint and the view direction;

obtaining render sample points on the plurality of sample rays associated with the target image; and rendering, by inputting the render sample points to the trained machine learning model, colors associated with pixels of the target image.

18. The non-transitory storage medium according to claim 17, wherein the radiance field comprises a three-dimensional (3D) rendering space enclosing the object.

19. The non-transitory storage medium according to claim 18, wherein the machine learning model is a fully connected neural network comprising at least one node, each having an associated weight.

20. The non-transitory storage medium according to claim 19, wherein the machine learning model is configured to accept a position vector and a direction vector of a point in the 3D rendering space as an input and output a density and a radiance of the point, the position vector indicating a location of the point with respect to the viewpoint, and the direction vector indicating a relative direction of the point with respect to the viewpoint.

* * * * *